United States Patent [19]

Haddad, Jr.

[11] Patent Number: 5,102,182

[45] Date of Patent: Apr. 7, 1992

[54] FLEXIBLE TRUCK COVER WITH PULL-DOWN ASSEMBLY

[75] Inventor: Edward N. Haddad, Jr., Worcester, Mass.

[73] Assignee: Pioneer Consolidated Corporation, North Oxford, Mass.

[21] Appl. No.: 712,066

[22] Filed: Jun. 7, 1991

[51] Int. Cl.$^5$ .............................................. B60J 7/00
[52] U.S. Cl. ................................... 296/100; 296/105
[58] Field of Search .......................... 296/100, 105, 98

[56] References Cited

U.S. PATENT DOCUMENTS

| | | | |
|---|---|---|---|
| 1,827,059 | 10/1931 | Woolcott | 296/100 |
| 3,041,104 | 6/1962 | Richard | 296/100 |
| 3,416,834 | 12/1968 | Morse, Jr. | 296/100 |
| 3,841,697 | 10/1974 | McFarland | 296/100 |
| 4,189,178 | 2/1980 | Cramaro | 296/105 |
| 4,874,196 | 10/1989 | Goldstein et al. | 296/98 |

Primary Examiner—Robert R. Song
Attorney, Agent, or Firm—Weingarten, Schurgin, Gagnebin & Hayes

[57] ABSTRACT

A flexible truck cover is attached to supporting members which downwardly overlap the upper side edges of the truck container to cover the entire width of the container. The cover is extended and retracted along the length of the container by cable means on which the support members are mounted and which interconnect drive pulleys and pull-down pulleys mounted at opposing ends of the trailer. The pull-down pulleys draw the flexible cover downwardly over the rear edge of the container to cover the entire length of the container.

16 Claims, 5 Drawing Sheets

FLEXIBLE TRUCK COVER WITH PULL-DOWN ASSEMBLY

FIELD OF THE INVENTION

The invention relates to flexible truck covers and in particular to an assembly for drawing a flexible truck cover across a trailer and includes means for drawing the flexible cover downwardly across and over the rear over the trailer.

BACKGROUND OF THE INVENTION

The novel truck cover of the present invention provides complete coverage of the opening of a truck container. Complete closure of the opening is important where it is desirable to prevent rain from entering the container and to minimize the likelihood of load escaping from the container. Prior truck covers, for example the covers disclosed in U.S. Pat. No. 4,189,178 to Cramaro and U.S. Pat. No. 4,874,196 to Goldstein et al., do not overlap the rear edge of the trailer.

The present invention, in fully extended position, across the container, excludes rain from the container, thus protecting loads such as grain or road salt, which are adversely affected by the presence of water. The present invention also minimizes the escape of load from the container. Thus, the present invention remedies the problems associated with prior truck covers by providing a cover which downwardly overlaps three edges of the truck container.

SUMMARY OF THE INVENTION

The present invention provides a flexible truck cover which can be extended to completely cover the opening of the container. The flexible truck cover is attached to support members which are mounted on cables running the length of the container. The support members are configured to downwardly overlap the upper side edges of the container. One of the support members is attached to the front end of the container. Another of the support members is attached to the cables. The cables are mounted upon opposing drive pulleys disposed at one end of the container and opposing pull-down pulleys disposed at an opposite end of the container. Rotation of the drive pulleys in a first direction moves the support member connected to the cables towards the rear end of the container. As all support members are attached to the flexible cover, the support member attached to the cables draws the remaining unattached support members and the flexible cover across the container. At the rear end of the container the support member attached to the cables rotates around the pull-down pulleys to draw the leading edge of the flexible cover over the rear edge of the container. In fully extended position, the truck cover of the present invention completely covers the container opening. Rotation of the drive pulleys in a second direction moves the support member connected to the cables towards the front end of the container causing retraction of the flexible cover to expose the container opening.

DESCRIPTION OF THE DRAWINGS

The invention will be more fully understood from the following detailed description, taken in conjunction with the accompanying drawings in which.

DETAILED DESCRIPTION OF THE INVENTION

Figure 1:
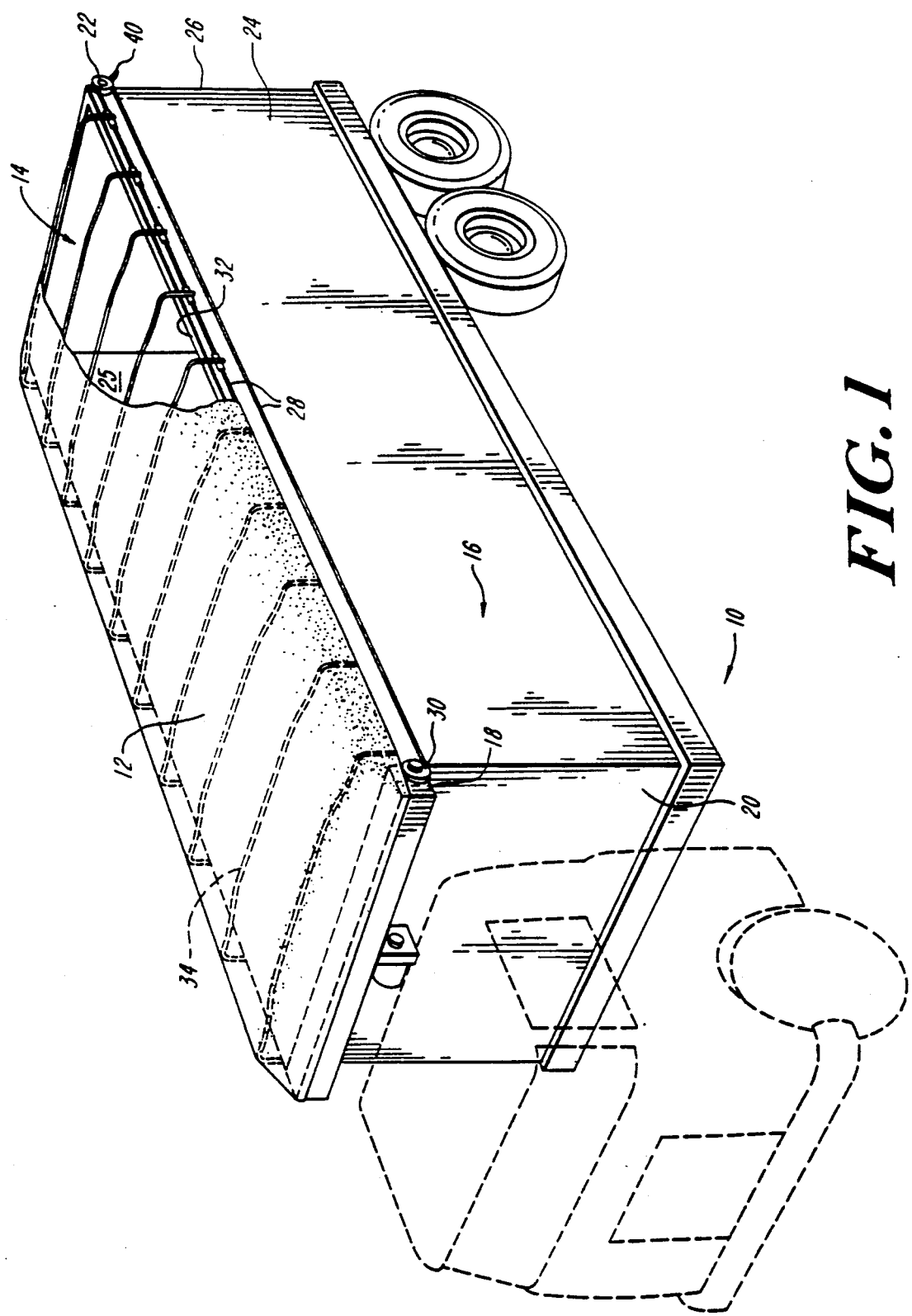
FIG. 1 is a perspective view of the present invention mounted upon a truck trailer.

Referring to FIG. 1, a perspective view of tractor-trailer unit 10 is illustrated. An embodiment of the truck cover 12 of the present invention is shown in cut away and fully extended across the opening 14 of trailer 16. Drive means 18 are mounted adjacent the front end 20 of trailer 16. A pull-down assembly 22 is mounted on side 24 of trailer 16 adjacent the rear end 26 thereof. A corresponding pull-down assembly (not shown) is externally mounted on the opposing side 25 of trailer 16. First cable means 28 interconnect pull-down assembly 22 and first drive pulley 30 of drive means 18. In the embodiment illustrated in FIG. 1, first cable means 28 extend along the exterior of side 24 of trailer 16 adjacent and below upper edge 32 of side 24. A corresponding second cable means (not shown) is similarly mounted on the exterior of side 25 of trailer 16. Truck cover 12 is preferably manufactured from a flexible water-resistant material such as vinyl-coated nylon. Alternatively, canvas can be used, although the tendency of canvas to submit to mildew after exposure to damp conditions is disadvantageous.

Figure 2:
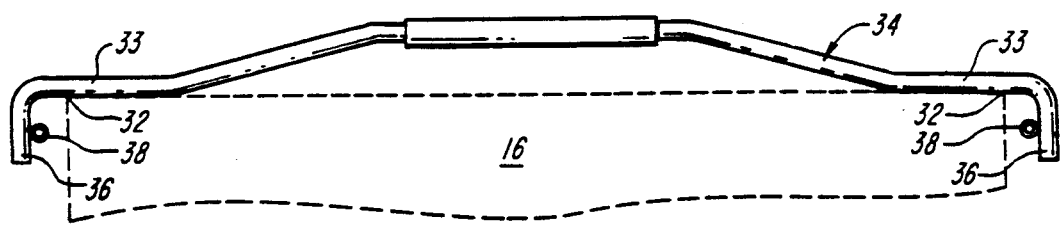
FIG. 2 is a front view of a support member of the present invention.
Figure 6A:
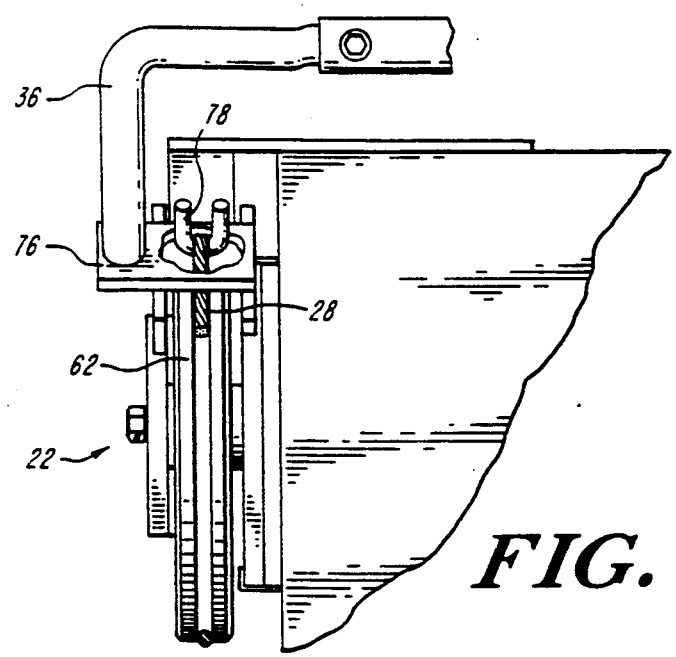
FIG. 6A is an end view of the pull-down assembly of the present invention.
Figure 6B:
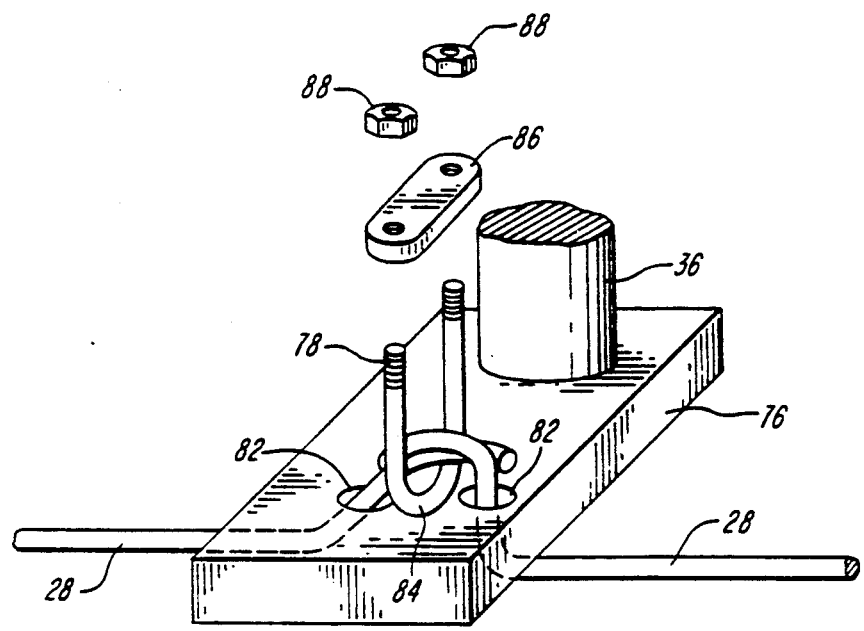
FIG. 6B is a projective view of the u-clamp means of the present invention.
Figure 7:
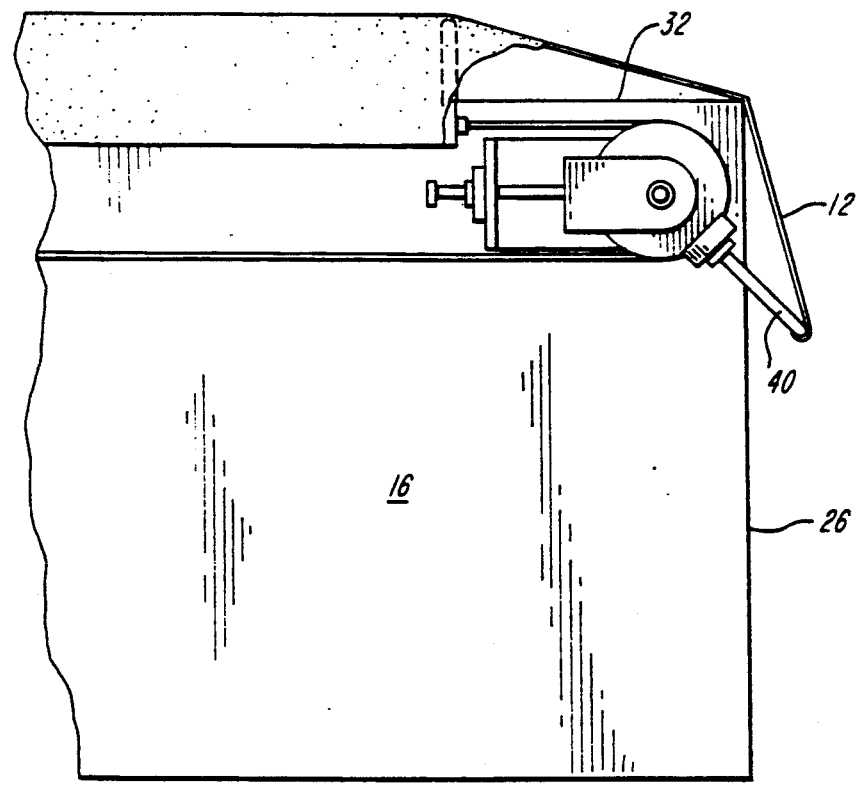
FIG. 7 is a side view of the pull-down assembly of the present invention with the flexible cover in fully extended position.

Truck cover 12 is supported by a series of support members 34. Support members 34 are attached to cover 12 by conventional means such as stitching or stapling. A support member 34 is illustrated in FIG. 2. In this embodiment, support member 34 comprises cross-member 33 and end portions 36 and is configured to extend fully across the width of trailer 16. End portions 36 of support member 34 downwardly overlap the upper side edges 32 of trailer 16. Cable receiving means 38, such as linear bearings, are attached to end portions 36. Cable receiving means 38 are dimensioned to receive cable means 28. The lead support member 40, that is, the most rearwardly disposed support member shown in FIG. 1, is fixedly attached to cable means 28, as illustrated in FIGS. 6a and 6b. Accordingly, motivation of cable means 28 causes motivation of lead support member 40 which, in turn, pulls flexible cover 12 and support members 34 across trailer 16.

Figure 3:
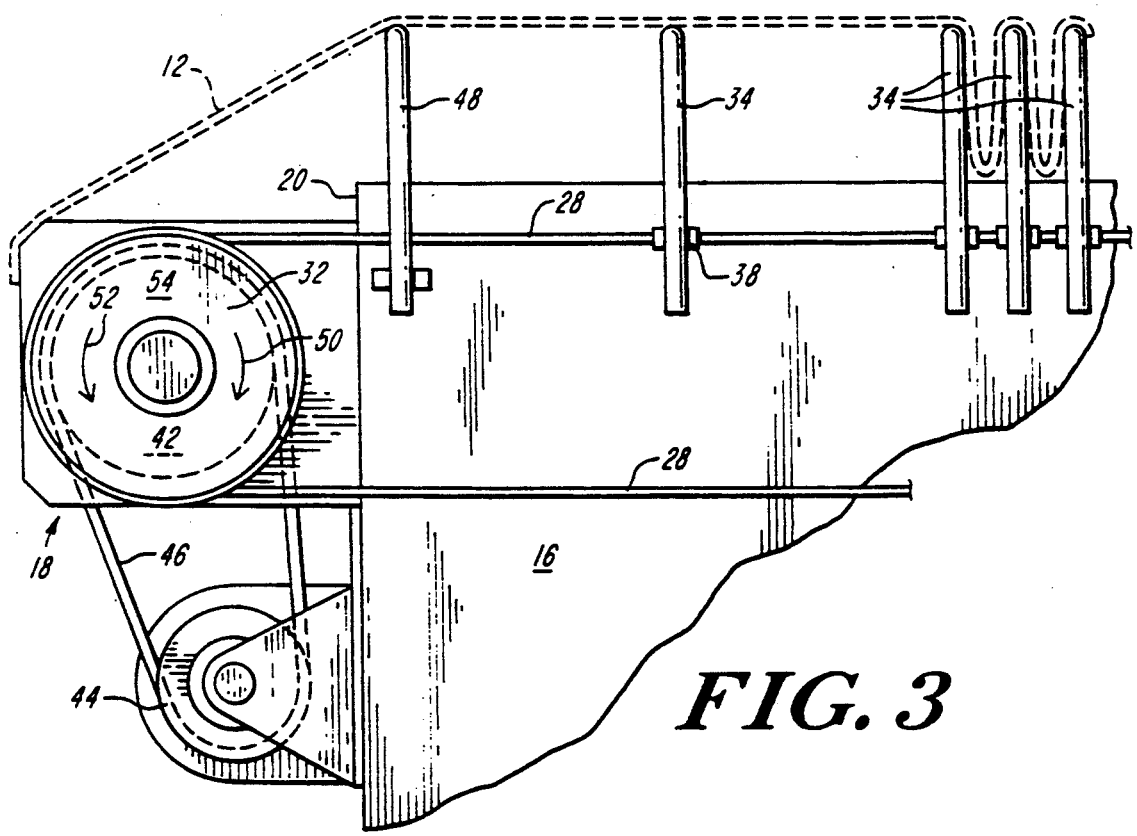
FIG. 3 is a side view of the drive means of the present invention.

Referring now also to FIG. 3, an embodiment of drive means 18 of the present invention is illustrated. In this embodiment, sprocket 42 and slip clutch 44 are interconnected by chain 46. Cable means 28 is mounted on and driven by drive pulley 54. FIG. 3 illustrates the position of the support members of the present invention when cover 12 is at least partially retracted and trailer 16 is at least partially uncovered. Fixed support member 48, that is, the support member most forwardly disposed with respect to the front 20 of trailer 16, is fixedly connected to trailer 16.

Figure 4:
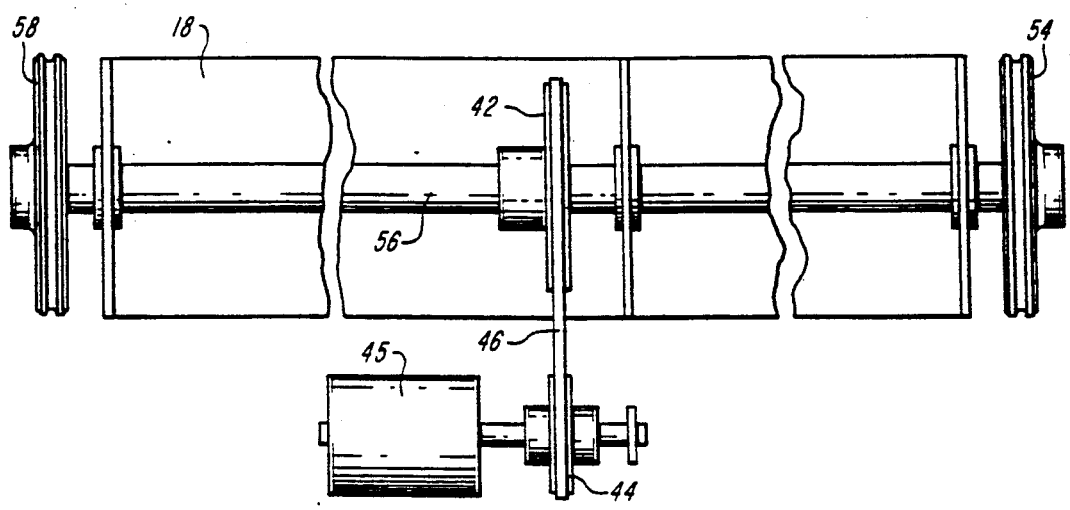
FIG. 4 is a front view of the drive means of the present invention.

Referring now also to FIG. 4, opposing drive pulley 58 is commonly mounted with drive pulley 54 on axle 56. Drive pulleys 54, 58 are driven via sprocket 42 and slip clutch 44 by electric motor 45 or such other drive means, for example a pneumatic or hydraulic motor, as are known in the art. Rotation of pulley 54 in a first direction, indicated by arrow 50 in FIG. 3, draws truck cover 12 across the opening 14 of trailer 16. As lead support member 40 is fixedly connected to cable means 28, such rotation of cable means 28 moves lead support member 40 towards rear end 26 of trailer 16. As truck cover 12 is attached to support members 34, motivation of lead support member 40 in a rearwardly direction will pull the truck cover 12 and support members 34 toward the rear end 26 of trailer 16.

Rearward movement of support members 34 ceases when lead support member 40 has rotated about pull-down assembly 22 and abuts rear end 26 of trailer 16, as will be more fully described below. Full extension of truck cover 12 is illustrated in FIG. 1.

To retract truck cover 12 to uncover opening 14 of trailer 16, drive pulley 54 is rotated in a counter clockwise direction as indicated by arrow 52 in FIG. 3. Such rotation of drive pulley 54 draws lead support member 40 in a forwardly direction towards the front 20 of trailer 16. As lead support member 40 is drawn in a forwardly direction, lead support member 40 urges support members 34 in a forwardly direction also. Forward movement of support members 34 is governed by support member 48 which is fixedly mounted on trailer 16. Accordingly, when truck cover 12 is fully retracted, support members 34 and lead support member 40 will be disposed towards the front 20 of trailer 16.

Figure 5:
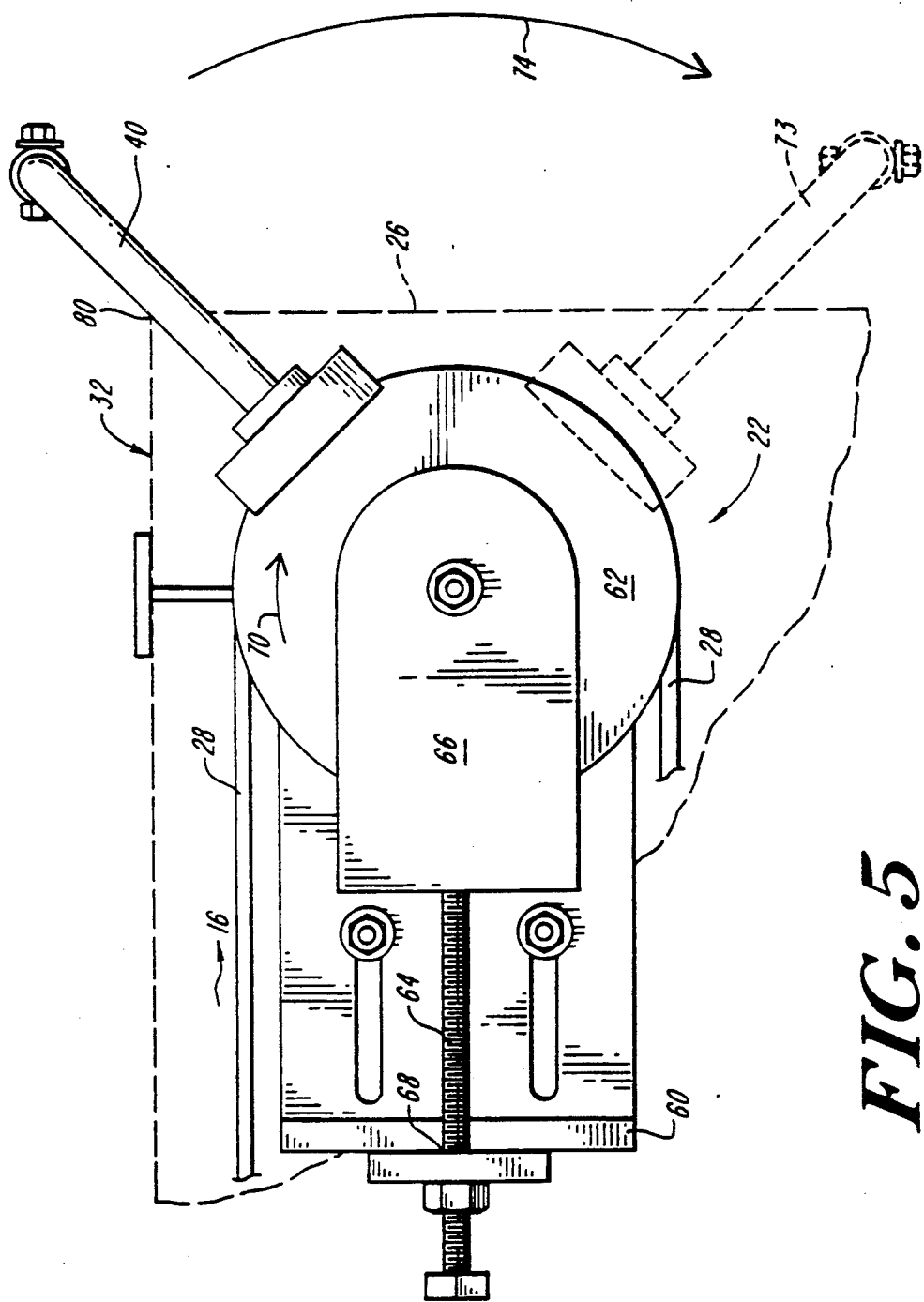
FIG. 5 is a side view of the pull-down assembly of the present invention.

Referring now to FIG. 5, an embodiment of the pull-down assembly 22 of the present invention is illustrated. Pull-down assembly 22 is mounted adjacent the rear end 26 of trailer 16, as also illustrated in FIG. 1, by mounting plate 60. A corresponding pull-down assembly (not shown) is mounted on the opposite side 25 of trailer 16. Pull-down assembly pulley 62 is mounted in sliding relationship with respect to mounting plate 60. Adjusting screw 64 is connected to bracket 66 and cooperates with a screw-threaded aperture 68 in mounting plate 60 to permit the slidable adjustment of pull-down assembly pulley 62 and provide a predetermined tension in cable means 28.

In FIG. 6a, an end view of a pull-down assembly 22 is illustrated. Cable means 28 is shown mounted on pull-down assembly pulley 62. End portion 36 of lead support member 40 is connected to attaching plate 76 which in turn is connected to cable means 28 by conventional means such as by a cable clamp 78, as illustrated in FIG. 6b. Referring to 6b, each end of cable means 28 passes through a respective hole 82 in attaching plate 76. Each end of cable means 28 is retained in overlapping relationship in the u-portion of 84 of cable clamp 78 by cable clamp plate 86 which is slideably mounted on cable clamp 78. Cable clamp 78 is welded to attaching plate 76. Cable clamp plate 86 is retained in sliding engagement on cable clamp 78 and abutting one or both ends of cable means 28 by retaining nuts 88 which cooperate with screw threads on cable clamp 78.

As shown in FIGS. 5, 6a, 6b and 7, end portion 36 of lead support member 40 is disposed on pull-down pulley 62 adjacent rear end 26 of trailer 16, indicating that the cover has been drawn across to cover the opening 14 of trailer 16. Rotation of pull-down assembly pulley 62 in a first direction, as indicated by arrow 70, causes lead support member 40 to rotate about pull-down assembly pulley 62 as indicated by arrow 74. Downwardly movement of lead support member 40 ceases when lead support member 40 abuts rear end 26 of trailer 16. Once lead support member 40 is pulled down to the position identified with numeral 73, truck cover 12 downwardly overlaps the upper edge 80 of rear end 26 of trailer 16 to ensure that no portion of opening 14 of trailer 16 is upwardly exposed. Accordingly, rain is excluded from trailer 16 and the likelihood of escape of load is minimized.

Numerous modifications and variations of the present invention are possible in light of the above teachings. It is, therefore, to be understood that within the scope of the appended claims, the present invention may be practiced otherwise than as in the embodiments specifically described herein above.

What is claimed is:

1. A truck cover assembly for drawing a flexible cover across an upwardly open trailer having front and rear ends and first and second sides comprising:

a flexible cover having a leading edge;

deploying means disposed on the trailer for drawing said cover across the trailer and beyond the rear end of the trailer, said deploying means comprising cable means extending from the front end of the trailer to the rear end of the trailer; and at least one support member attached to said flexible cover and to said cable means, said at least one support member being fixed to said cable means by a laterally extending plate, wherein said at least one support member is secured to and extending perpendicularly from said plate and said cable means is secured to said plate at a laterally spaced location from said support member.

2. The truck cover assembly of claim 1 further including a plurality of further support members attached at intermediate locations to said flexible cover and connected to said deploying means.

3. The truck cover assembly of claim 2 further comprising linear bearing means for connecting said plurality of further support members to said deploying means.

4. The truck cover assembly of claim 2 wherein one of said plurality of further support members is fixedly attached to the trailer.

5. The truck cover assembly of claim 1 wherein:

said deploying means further comprise:

drive means disposed adjacent the front end of the trailer for activating said deploying means, and pull-down means disposed adjacent the rear end of the trailer for drawing said flexible cover beyond the rear end of the trailer; and said cable means interconnects said drive means and said pull-down means.

6. The truck cover assembly of claim 5 wherein said drive means comprises motor means.

7. The truck cover assembly of claim 5 wherein:

said drive means comprises first and second drive pulleys;

said pull-down means comprises first and second pull-down pulleys; and said cable means comprises:

a first cable cooperative with said first drive pulley and said first pull-down assembly; and a second cable cooperative with said second drive pulley and said second pull-down assembly.

8. A truck cover deploying assembly for use with an upwardly open trailer having front and rear ends and first and second sides, comprising:

a flexible cover having a leading edge;

drive pulley means disposed at the front end of the trailer for deploying said flexible cover across the trailer;

pull-down pulley means disposed at the rear end of the trailer for deploying a portion of said flexible cover over the rear end of the trailer with said leading edge of said flexible cover overlying the top edge of the rear end of the trailer;

cable means for interconnecting said front drive pulley means and said rear pull-down pulley means; and a plurality of U-shaped cover support members attached to said flexible cover and connected to said cable means, said plurality of cover support members including a U-shaped lead cover support member fixedly connected to said leading edge of said flexible cover and fixedly connected to said cable means by a laterally extending plate for movement with said cable means to rotate about said pull-down pulley means to pass over the top edge of the rear end of the trailer with said leading edge of said flexible cover.

9. The truck cover assembly of claim 8 wherein;

said drive pulley means comprises first and second interconnected drive pulleys mounted on the first and second sides of the trailer, respectively; and said pull-down pulley means comprises first and second pull-down pulleys mounted on the first and second sides of the trailer, respectively.

10. The truck cover assembly of claim 9 further comprising means for driving at least one of said first and second drive pulleys.

11. The truck cover assembly of claim 10 wherein said driving means comprises an electronic motor.

12. The truck cover assembly of claim 10 wherein said driving means comprises a pneumatic motor.

13. The truck cover assembly of claim 10 wherein said driving means comprises a hydraulic motor.

14. The truck cover assembly of claim 8 wherein:

each of said plurality of cover support members includes a cross-member and first and second depending end portions; and said first and second depending end portions are dimensioned to outwardly overlap the first and second sides of the trailer.

15. The truck cover assembly of claim 1 further comprising a cable clamp for securing said cable means to said plate to prevent movement of said cable means relative to said plate and said at least one support member.

16. The truck cover assembly of claim 1 wherein said at least one support member is attached to said cover at said leading edge.

* * * * *